United States Patent
Pratt et al.

(10) Patent No.: US 8,151,135 B2
(45) Date of Patent: Apr. 3, 2012

(54) SYSTEM AND METHOD FOR RECOVERY OF PRIMARY STORAGE RESOURCE FAILURE

(75) Inventors: Thomas L. Pratt, Austin, TX (US); Christopher A. Spencer, Austin, TX (US); Munif M. Farhan, Round Rock, TX (US); Sharon Lyn Hanson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 162 days.

(21) Appl. No.: 12/765,302

(22) Filed: Apr. 22, 2010

(65) Prior Publication Data

US 2011/0264951 A1    Oct. 27, 2011

(51) Int. Cl.
  *G06F 11/00* (2006.01)
(52) U.S. Cl. .......................................... 714/5.1; 714/6.3
(58) Field of Classification Search ............... 714/5.1, 714/5.11, 6.1, 6.2, 6.21, 6.22, 6.23, 6.3, 6.31, 714/6.32, 10–13
  See application file for complete search history.

(56) References Cited

U.S. PATENT DOCUMENTS

| | | | |
|---|---|---|---|
| 7,117,393 B2 * | 10/2006 | Baba et al. | 714/25 |
| 7,178,059 B2 * | 2/2007 | Greenspan et al. | 714/13 |
| 7,565,567 B2 * | 7/2009 | Ross | 714/4.11 |
| 2005/0216577 A1 * | 9/2005 | Durham et al. | 709/223 |
| 2007/0226220 A1 * | 9/2007 | Aronoff et al. | 707/8 |

* cited by examiner

*Primary Examiner* — Dieu-Minh Le
(74) *Attorney, Agent, or Firm* — Baker Botts L.L.P.

(57) ABSTRACT

Systems and methods for reducing problems and disadvantages associated with traditional approaches to data and program storage on an information handling system are provided. A method may include determining if a primary storage resource has a failure. The method may further include, in response to determining that the storage resource does not have a failure: booting from a first operating system stored on the primary storage resource, monitoring data stored to the primary storage resource to identify data to be copied to a persistent storage resource, and copying the identified data to the persistent storage resource. The method may further include, in response to determining that the storage resource has a failure: booting from a second operating system stored on the persistent storage resource, and via the second operating system, providing access to the copied identified data copied to the persistent storage resource.

20 Claims, 2 Drawing Sheets

SYSTEM AND METHOD FOR RECOVERY OF PRIMARY STORAGE RESOURCE FAILURE

TECHNICAL FIELD

The present disclosure relates generally to information handling systems and, more particularly, to a system and method for recovery of primary storage resource failure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ storage resources (e.g., hard disk drives) to store data and programs of instructions for later retrieval. Traditionally, when a storage resource of an information handling system fails, the information handling system may be rendered unusable. Thus, in the event of a storage resource failure, an end user may not have the ability to reboot the information handling system to recover recently-accessed or critical user files. The problem may become even more amplified when an end user is working remotely or traveling—files may be lost and the information handling system may become unusable, leaving the end user at a standstill for productivity.

SUMMARY

In accordance with one embodiment of the present disclosure, an information handling system may include a processor, a memory communicatively coupled to the processor, a primary storage resource communicatively coupled to the processor, and a persistent storage resource communicatively coupled to the processor. The primary storage resource may have stored thereon a first operating system and data, the primary storage resource configured to boot the first operating system in the absence of a failure of the primary storage resource. The persistent storage resource may have stored thereon a second operating system, and may be configured to store backup data including a copy of at least a portion of the data stored on the primary storage resource, boot the second operating system in the event of a failure of the primary storage resource, and via the second operating system, provide access to the backup data to a user of the information handling system.

In accordance with another embodiment of the present disclosure, a method may include determining if a primary storage resource has a failure. The method may further include, in response to determining that the storage resource does not have a failure: booting from a first operating system stored on the primary storage resource, monitoring data stored to the primary storage resource to identify data to be copied to a persistent storage resource, and copying the identified data to the persistent storage resource. The method may further include, in response to determining that the storage resource has a failure: booting from a second operating system stored on the persistent storage resource, and via the second operating system, providing access to the copied identified data copied to the persistent storage resource.

In accordance with a further embodiment of the present disclosure, a system may include logic for determining if a primary storage resource has a failure. The system may further include logic for, in response to determining that the storage resource does not have a failure: booting from a first operating system stored on the primary storage resource; monitoring data stored to the primary storage resource to identify data to be copied to a persistent storage resource; and copying the identified data to the persistent storage resource. The system may further include logic for, in response to determining that the storage resource has a failure: booting from a second operating system stored on the persistent storage resource; and via the second operating system, providing access to the copied identified data copied to the persistent storage resource.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more busses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape drive), compact disc, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
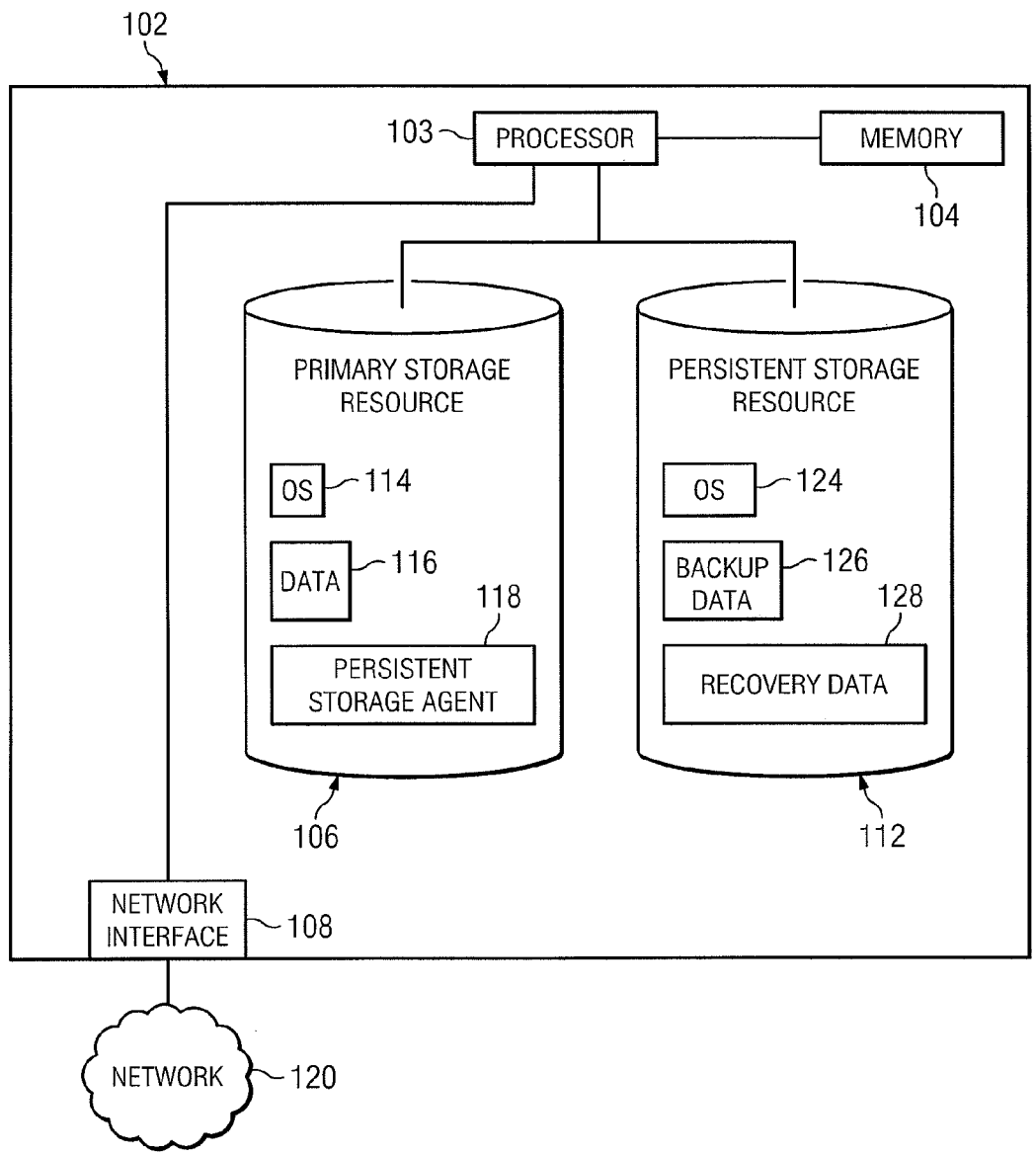
FIG. 1 illustrates a block diagram of an example information handling system, in accordance with embodiments of the present disclosure.

FIG. 1 illustrates a block diagram of an example information handling system 102, in accordance with embodiments of the present disclosure. In certain embodiments, information handling system 102 may be a personal computer (e.g., a desktop computer or a portable computer). As depicted in FIG. 1, information handling system 102 may comprise a processor 103, a memory 104 communicatively coupled to processor 103, a primary storage resource 106 communicatively coupled to processor 103, a persistent storage resource 112 communicatively coupled to processor 103, and a network interface 108.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory 104, storage resource 106, and/or another component of information handling system 102.

Memory 104 may be communicatively coupled to processor 103 and may comprise any system, device, or apparatus configured to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, solid state storage, or any suitable selection and/or array of volatile or non-volatile memory that retains data after power to information handling system 102 is turned off.

Primary storage resource 106 may be communicatively coupled to processor 103 and may include any system, device, or apparatus configured to retain program instructions or data for a period of time (e.g., a computer-readable medium). In some embodiments, primary storage resource 106 may include a hard disk drive, a magnetic tape library, an optical disk drive, a magneto-optical disk drive, a compact disc drive, a solid state storage drive, a FLASH drive and/or any other suitable computer-readable medium. In embodiments of the present disclosure, primary storage resource 106 may be the "main" or "primary" local storage resource from which processor 103 may load programs and/or data and/or store data. Accordingly, information handling system 102 may be configured such that primary storage resource 106 may be or may include the boot volume of information handling system 102.

As shown in FIG. 1, primary storage resource 106 may include an operating system 114, data 116, and a persistent storage agent 118. Operating system 114 may comprise one or more programs of instructions executable by processor 103 and configured to control the allocation and usage of hardware resources (e.g., processor 103, memory 104, storage resources 106 and 112, network interface 108, and/or other components), and thus acts as host for application programs to be executed by information handling system 102. Examples of operating system 114 may include, without limitation, Windows, MacOS, UNIX, and LINUX. In some embodiments of the present disclosure, operating system 114 may be the "main" or "primary" operating system of information handling system 102.

Data 116 may include any type and/or amount of information, including without limitation, text files, video files, image files, audio files, numeric files, and/or executable files, that may be read and/or written by processor 103.

Persistent storage agent 118 may include any system, device, or apparatus configured to monitor and/or manage data (e.g., backup data 126) stored to persistent storage resource 112. For example, as is described in greater detail below, persistent storage agent 118 may be configured to copy and/or store recently-used, frequently-used, and/or critical files of data 116 to persistent storage resource 112. While persistent storage agent 118 is depicted as a program of instructions in FIG. 1, persistent storage agent may be implemented in hardware, software, firmware, or any combination thereof.

Persistent storage resource 112 may be communicatively coupled to processor 103 and may include any system, device, or apparatus configured to retain program instructions or data for a period of time (e.g., a computer-readable medium). In some embodiments, persistent storage resource 112 may include a hard disk drive, a magnetic tape library, an optical disk drive, a magneto-optical disk drive, a compact disc drive, a solid state storage drive, a FLASH drive and/or any other suitable computer-readable medium. In embodiments of the present disclosure, information handling system 102 may be configured such that persistent storage resource 112 does not, under normal operating conditions, include the boot volume of information handling system 102, and thus may be a "secondary" storage resource. In the same or alternative embodiments, persistent storage resource 112 may have significantly smaller storage capacity than that of primary storage resource 106. In these and other embodiments, persistent storage resource 112 may be of a different type than that of primary storage resource 106 (e.g., primary storage resource 106 may be a magnetic hard-disk drive, while persistent storage resource 112 may include flash memory and/or a solid state storage device).

As shown in FIG. 1, persistent storage resource 112 may include an operating system 124 and data 126. Operating system 124 may comprise one or more programs of instructions executable by processor 103 and configured to control the allocation and usage of hardware resources (e.g., processor 103, memory 104, storage resources 106 and 112, network interface 108, and/or other components), and thus acts as host for application programs to be executed by information handling system 102. Examples of operating system 114 may include, without limitation, Windows, MacOS, UNIX, and LINUX. In some embodiments of the present disclosure, operating system 124 may be identical or similar to operating system 114. In the same or alternative embodiments, operating system 124 may be a smaller or stripped-down version of operating system 114 which includes some, but not all, or the components of operating system 114.

Backup data 126 may include any type and/or amount of information, including without limitation, text files, video files, image files, audio files, numeric files, and/or executable files, that may be read and/or written by processor 103. In embodiments of the present disclosure, backup data 126 may include copies of recently-accessed, frequently-accessed, or critical files of data 116.

Recovery data 128 may include any type and/or amount of information, including without limitation, text files, video files, image files, audio files, numeric files, and/or executable files, that may be read and/or written by processor 103. In embodiments of the present disclosure, recovery data 128 may include data other than backup data 126 that may be used to assist in recovery of primary storage resource 106 in the event of a failure (e.g., diagnostic programs, installation images or installation programs for operating system 114 and/or application programs included within data 116, etc.). In some embodiments, recovery data 128 may come pre-stored on persistent storage resource 112, such that contents of recovery data 128 are not regularly copied from primary storage resource 106 as is backup data 126.

Network interface 108 may include any suitable system, apparatus, or device operable to serve as an interface between information handling system 102 and network 120. Network interface 108 may enable information handling system 102 to communicate over network 120 using any suitable transmission protocol and/or standard, including without limitation all transmission protocols and/or standards enumerated below with respect to the discussion of network 120. Network interface 108 and its various components may be implemented using hardware, software, or any combination thereof.

Network 120 may be a network and/or fabric configured to communicatively couple information handling system 102 to other information handling systems and/or other devices. In certain embodiments, network 120 may include a communication infrastructure, which provides physical connections, and a management layer, which organizes the physical connections of information handling system 102 and other devices coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Ethernet Asynchronous Transfer Mode (ATM), Internet protocol (IP), or other packet-based protocol, and/or any combination thereof. Network 120 and its various components may be implemented using hardware, software, or any combination thereof.

In typical operation of information handling system 102, processor 103 will load and execute operating system 114 and perform input/output operations (e.g., reads and writes) with data 116 stored on primary storage resource 106. In addition, during such typical operation, persistent storage agent 118 will manage persistent storage resource 126 such that recently-accessed, frequently-accessed, and/or critical files of data 116 are copied and stored as backup data 126 on persistent storage resource 112. Persistent storage agent 118 may select data to be copied and stored in any suitable manner. For example, persistent storage agent 118 may determine one or more recently-accessed files to be copied and stored as backup data 126. Alternatively or in addition thereto, persistent storage agent 118 may determine one or more frequently-accessed files to be copied and stored as backup data 126. Alternatively or in addition thereto, persistent storage agent 118 may determine that one or more files deemed as critical (e.g., a word processing program, an email program, an Internet browser, diagnostic programs, hardware drivers, certain productivity software, etc.) to be copied and stored as backup data 126. Files may be determined to be critical in any suitable manner, including without limitation, based on configuration settings set by a user or administrator.

In the event of a failure of primary storage resource 106 (e.g., physical failure, corruption of operating system 114 stored thereon, and/or other event preventing the execution of operating system 114), information handling system may boot from operating system 124. In addition, an end user may access backup data 126 (including files recently-accessed and/or frequently-accessed prior to the failure, and/or other critical files), thus allowing the end user to continue to perform tasks the end user performed prior to the failure. Moreover, programs included in recovery data 128 may allow an end user to remotely connect to a virtual desktop or similar network resource allowing the user to access desired application programs, again allowing the end user to continue to perform tasks the end user performed prior to the failure. Further, programs included in recovery data 128 may allow the end user or another person to diagnose the cause of the failure and/or recover from the failure by reconfiguring and/or repairing primary storage resource 106 and/or operating system 114, reinstalling operating system 114, reinstalling application programs or other data 116, and/or communicating a service request to an administrator or information technologist via network 120.

Figure 2:
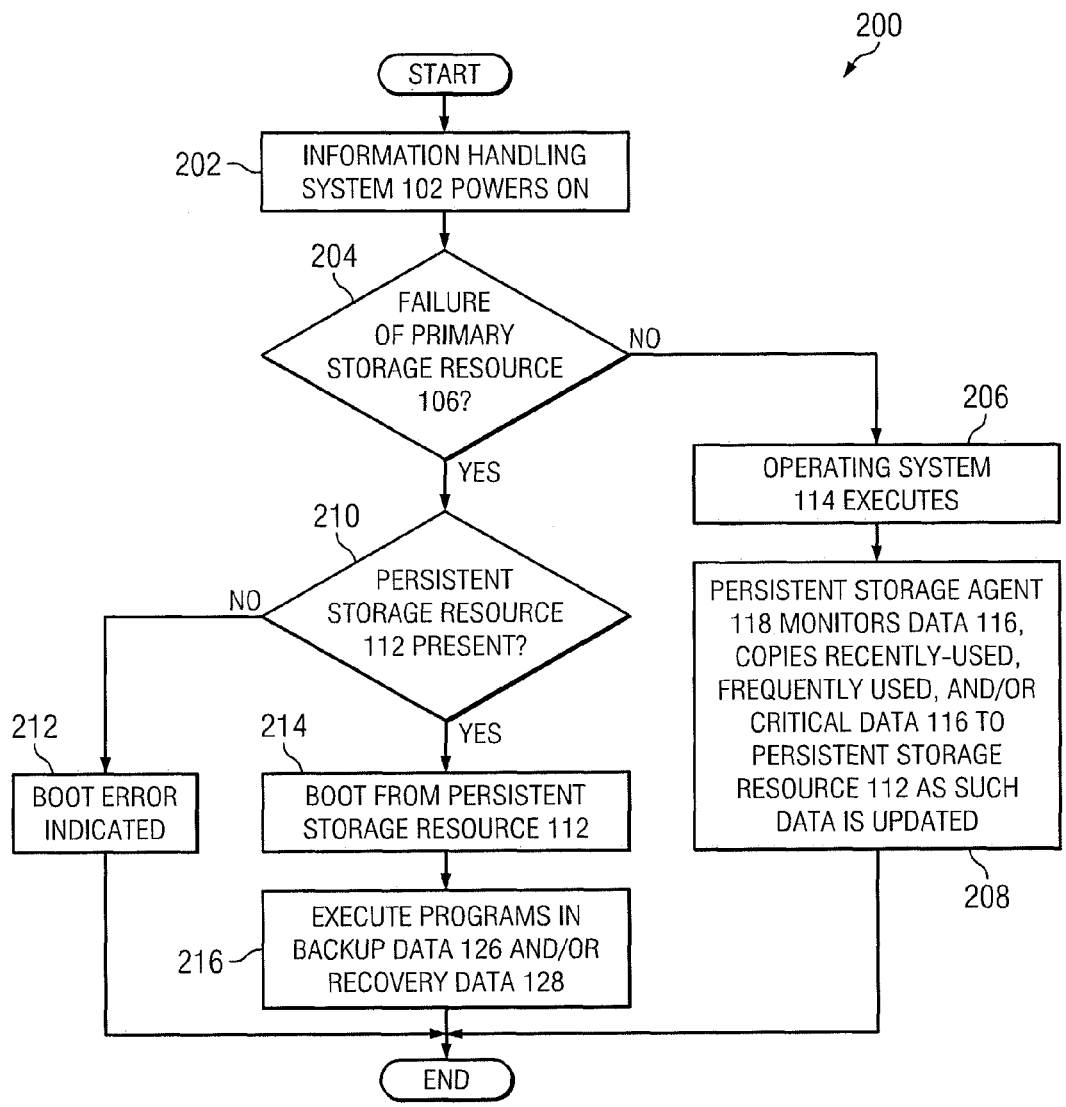
FIG. 2 illustrates a flow chart of an example method for booting an information handling system, in accordance with embodiments of the present disclosure.

FIG. 2 illustrates a flow chart of an example method 200 for booting information handling system 102, in accordance with embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps 202-216 comprising method 200 may depend on the implementation chosen.

At step 202, information handling system 102 may power on and begin the boot process. For example, a program of instructions present in a basic input-output system (BIOS) of information handling system 102 may be loaded into processor 103 to carry out the boot process.

At step 204, the BIOS executing on processor 103 may determine whether a failure exists in primary storage resource 106 (e.g., physical failure of primary storage resource 112 or another condition which prevents loading and execution of operating system 114). If a failure exists, method 200 may proceed to step 210. Otherwise, if a failure does not exist, method 200 may proceed to step 206.

At step 206, in response to a determination that no failure exists in primary storage resource 106, operating system 114 may be loaded into memory 104 and executed by processor 103.

At step 208, persistent storage agent 118 may be loaded into memory 104 and executed by processor 103, where it may monitor data 116 and copy recently-used, frequently-used and/or critical data 116 to persistent storage resource 112 as such data is updated. After completion of step 208, method 200 may end.

At step 210, in response to a determination that a failure exists in primary storage resource 106, the BIOS executing on processor 103 may determine whether persistent storage resource 112 is present. If persistent storage resource 112 is present, method 200 may proceed to step 214. Otherwise, if persistent storage resource 112 is not present, method 200 may proceed to step 212.

At 212, in response to a determination that persistent storage resource 112 is not present, BIOS executing on processor 103 may indicate that a boot error has occurred. After completion of step 212, method 200 may end.

At 214, in response to a determination that persistent storage resource 112 is present, operating system 124 may be loaded into memory 104 and executed by processor 103.

At step 216, one or more programs in backup data 126 and/or recovery data 128 may be loaded and executed by processor 103. After completion of step 216, method 200 may end. Among the tasks that may be undertaken by the one or more programs at step 216 include, without limitation:

- execution of diagnostics utilities (e.g., to determine the cause of and/or solution to failure of primary storage resource 106);
- copying of backup data 126 to another storage device (e.g., to a storage device external to information handling system 102, such that the data may be accessed by another information handling system);
- remotely connecting to network 120 in order to submit a service request to an administrator or information technologist regarding the failure of primary storage resource 106;
- remotely connecting to network 120 in order to download and reinstall operating system 114 and data 116 to primary storage unit;
- remotely connecting to network 120 in order to connect to a virtual desktop and/or network-based application to allow an end user to continue productivity;
- reinstall operating system 114 and data 116 to primary storage unit using installation programs within recovery data 128; and
- executing applications (e.g., within backup data 126 and/or recovery data 128) to allow an end user to continue productivity.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system information handling system 102 or any other system operable to implement method 200. In certain embodiments, method 200 may be implemented partially or fully in software and/or firmware embodied in computer-readable media.

A component of information handling system 102 may include an interface, logic, and/or other suitable elements. An interface receives input, sends output, processes the input and/or output, and/or performs other suitable operation. An interface may comprise hardware and/or software. Logic performs the operations of the component, for example, executes instructions to generate output from input. Logic may include hardware, software, and/or other logic. Logic may be encoded in one or more tangible computer readable storage media and may perform operations when executed by a processor or other component.

Although the disclosed embodiments have been described in detail, it should be understood that various changes, substitutions and alterations can be made to the embodiments without departing from their spirit and scope.

What is claimed is:

1. An information handling system, comprising:
   a processor;
   a memory communicatively coupled to the processor;
   a primary storage resource communicatively coupled to the processor and having stored thereon a first operating system and data, the primary storage resource configured to boot the first operating system in the absence of a failure of the primary storage resource; and
   a persistent storage resource communicatively coupled to the processor and having stored thereon a second operating system, the persistent storage resource configured to:
      store backup data including a copy of at least a portion of the data stored on the primary storage resource;
      boot the second operating system in the event of a failure of the primary storage resource; and
      via the second operating system, provide access to the backup data to a user of the information handling system.

2. An information handling system according to claim 1, wherein the backup data includes at least one of: recently-updated files, frequently-updated files, and files deemed critical.

3. An information handling system according to claim 1, wherein the persistent storage resource further has stored thereon recovery data other than the backup data, the recovery data configured to assist in recovery of the primary storage resource in the event of a failure of the primary storage resource.

4. An information handling system according to claim 3, the recovery data including at least one of: a program for diagnosing the failure of the primary storage resource, a program for repairing the failure of the primary storage resource, and a program for re-installing the first operating system on the primary storage resource.

5. An information handling system according to claim 1, wherein each of the data and the backup data includes at least one of a text file, a video file, an image file, an audio file, a numeric file, and an executable file.

6. An information handling system according to claim 1, wherein the primary storage resource is a hard disk drive.

7. An information handling system according to claim 1, wherein the persistent storage resource comprises at least one of a flash memory and a solid state storage device.

8. An information handling system according to claim 1, the primary storage device further having stored thereon a persistent storage agent program, the persistent storage agent program including one or more instructions configured to, when executed by the processor:
   monitor data stored to the primary storage resource to identify data to be copied to the persistent storage resource; and
   copy identified data to the persistent storage resource.

9. An information handling system according to claim 1, wherein the second operating system is substantially identical to the first operating system.

10. An information handling system according to claim 1, wherein the second operating system includes a subset of the components of the first operating system.

11. A method, comprising:
   determining if a primary storage resource has a failure;
   in response to determining that the storage resource does not have a failure:
      booting from a first operating system stored on the primary storage resource;
      monitoring data stored to the primary storage resource to identify data to be copied to a persistent storage resource; and
      copying the identified data to the persistent storage resource; and in response to determining that the storage resource has a failure:
    booting from a second operating system stored on the persistent storage resource; and
    via the second operating system, providing access to the copied identified data copied to the persistent storage resource.

12. A method according to claim 11, wherein monitoring data stored to the primary storage resource to identify data to be copied to the persistent storage resource includes identifying at least one of: recently-updated files, frequently-updated files, and files deemed critical.

13. An method according to claim 11, further comprising, in response to determining that the storage resource has a failure, executing a program stored on the persistent storage resource, the program comprising at least one of: a program for repairing the failure of the primary storage resource, and a program for re-installing the first operating system on the primary storage resource.

14. A method according to claim 11, wherein each of the data and the identified data includes at least one of a text file, a video file, an image file, an audio file, and an executable file.

15. A method according to claim 11, wherein the primary storage resource is a hard disk drive.

16. A method according to claim 11, wherein the persistent storage resource comprises at least one of a flash memory and a solid state storage device.

17. A method according to claim 11, wherein the second operating system is substantially identical to the first operating system.

18. A method according to claim 11, wherein the second operating system includes a subset of the components of the first operating system.

19. A system, comprising:
    logic for determining if a primary storage resource has a failure;
    logic for, in response to determining that the storage resource does not have a failure:
        booting from a first operating system stored on the primary storage resource;
        monitoring data stored to the primary storage resource to identify data to be copied to a persistent storage resource; and
        copying the identified data to the persistent storage resource; and
    logic for, in response to determining that the storage resource has a failure:
        booting from a second operating system stored on the persistent storage resource; and
        via the second operating system, providing access to the copied identified data copied to the persistent storage resource.

20. An system according to claim 19, further comprising, logic for, in response to determining that the storage resource has a failure, executing a program stored on the persistent storage resource, the program comprising at least one of: a program for repairing the failure of the primary storage resource, and a program for re-installing the first operating system on the primary storage resource.

* * * * *